(12) United States Patent
Grolle

(10) Patent No.: US 8,577,579 B2
(45) Date of Patent: Nov. 5, 2013

(54) ENGINE CONTROL REQUEST FROM ADAPTIVE CONTROL WITH BRAKING CONTROLLER

(75) Inventor: Kenneth A. Grolle, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 617 days.

(21) Appl. No.: 12/697,873

(22) Filed: Feb. 1, 2010

(65) Prior Publication Data

US 2011/0191000 A1 Aug. 4, 2011

(51) Int. Cl.
- B60W 30/16 (2012.01)
- B60W 10/18 (2012.01)
- B60W 10/06 (2006.01)
- B60Q 1/00 (2006.01)

(52) U.S. Cl.
USPC ........ 701/96; 701/1; 701/51; 701/54; 701/70; 701/93; 340/453; 477/107

(58) Field of Classification Search
USPC .......... 123/322, 350, 436; 180/167, 169, 170; 303/122.15, 142, 191, 20, 3; 340/435, 340/436, 438, 439, 442, 447, 5.5, 539.27, 340/870.16, 903; 370/349, 350, 392, 466; 701/1.4, 36, 38, 48, 51, 533, 54, 55, 701/70, 93, 96
See application file for complete search history.

(56) References Cited

U.S. PATENT DOCUMENTS

| | | | |
|---|---|---|---|
| 3,780,373 A | 12/1973 | Holst et al. | |
| 4,328,494 A | 5/1982 | Goodall | |
| 5,231,872 A | 8/1993 | Bowler et al. | |
| 5,606,732 A | 2/1997 | Vignone, Sr. | |
| 5,659,304 A * | 8/1997 | Chakraborty | 340/903 |
| 5,839,534 A * | 11/1998 | Chakraborty et al. | 180/169 |
| 6,034,597 A | 3/2000 | Normann et al. | |
| 6,076,622 A * | 6/2000 | Chakraborty et al. | 180/169 |
| 6,181,241 B1 | 1/2001 | Normann et al. | |
| 6,232,875 B1 | 5/2001 | DeZorzi | |
| 6,289,332 B2 | 9/2001 | Menig et al. | |
| 6,293,096 B1 | 9/2001 | Khair et al. | |
| 6,334,081 B1 * | 12/2001 | Robinson et al. | 701/48 |
| 6,347,680 B1 * | 2/2002 | Mianzo et al. | 180/197 |
| 6,357,839 B1 | 3/2002 | Eckert | |
| 6,473,686 B2 * | 10/2002 | Adachi et al. | 701/96 |
| 6,501,372 B2 | 12/2002 | Lin | |
| 6,518,875 B2 | 2/2003 | DeZorzi | |

(Continued)

OTHER PUBLICATIONS

SmarTire Tire Pressure Monitoring System by Bendix CVS, Operators Manual, BW-2799, Jun. 2010.

(Continued)

Primary Examiner — Fadey Jabr
Assistant Examiner — Kevin P Mahne
(74) Attorney, Agent, or Firm — Calfee, Halter & Griswold LLP

(57) ABSTRACT

A vehicle control system includes a forward vehicle sensor transmitting a forward vehicle message based on a range to a forward vehicle. An adaptive cruise controller receives the forward vehicle message from the forward vehicle sensor. The adaptive cruise controller transmits a cruise controller message based on the range to the forward vehicle. A braking system controller receives the cruise controller message and transmits an engine control message based on the cruise controller message. An engine controller receives the engine control message and controls a torque and/or speed of an engine as a function of the engine control message.

21 Claims, 3 Drawing Sheets

(56) References Cited

U.S. PATENT DOCUMENTS

| | | | |
|---|---|---|---|
| 6,549,972 B1 | 4/2003 | Berstis et al. | |
| 6,581,449 B1 | 6/2003 | Brown et al. | |
| 6,597,981 B2 * | 7/2003 | Nishira et al. | 701/96 |
| 6,603,394 B2 | 8/2003 | Raichle et al. | |
| 6,769,504 B2 * | 8/2004 | Kobayashi et al. | 180/169 |
| 6,775,282 B1 | 8/2004 | Vakkalagadda et al. | |
| 6,794,993 B1 | 9/2004 | Kessler et al. | |
| 6,888,934 B2 | 5/2005 | Bell | |
| 6,972,671 B2 | 12/2005 | Normann et al. | |
| 7,139,653 B2 | 11/2006 | Ringger et al. | |
| 7,149,206 B2 * | 12/2006 | Pruzan et al. | 370/349 |
| 7,162,353 B2 * | 1/2007 | Minowa et al. | 701/96 |
| 7,253,784 B2 | 8/2007 | Shimura | |
| 7,309,260 B2 | 12/2007 | Brower et al. | |
| 7,348,878 B2 | 3/2008 | Fogelstrom | |
| 2001/0056320 A1 * | 12/2001 | Kato et al. | 701/51 |
| 2004/0034460 A1 * | 2/2004 | Folkerts et al. | 701/54 |
| 2004/0044448 A1 * | 3/2004 | Ramaswamy et al. | 701/22 |
| 2004/0155763 A1 | 8/2004 | Lin et al. | |
| 2004/0178897 A1 | 9/2004 | Fennel et al. | |
| 2005/0001470 A1 * | 1/2005 | Bale et al. | 303/3 |
| 2005/0001472 A1 * | 1/2005 | Bale et al. | 303/20 |
| 2005/0002417 A1 | 1/2005 | Kelly et al. | |
| 2007/0035452 A1 | 2/2007 | Lin et al. | |
| 2007/0038346 A1 | 2/2007 | Ehrlich et al. | |
| 2007/0046098 A1 * | 3/2007 | Grolle et al. | 303/122.15 |
| 2007/0052291 A1 * | 3/2007 | Eberling et al. | 303/191 |
| 2007/0164604 A1 * | 7/2007 | Bale et al. | 303/20 |
| 2007/0282514 A1 * | 12/2007 | Jarrix et al. | 701/96 |
| 2008/0021599 A1 * | 1/2008 | Bauerle et al. | 701/1 |
| 2008/0051962 A1 * | 2/2008 | Nakai et al. | 701/70 |
| 2008/0191855 A1 | 8/2008 | Fink et al. | |
| 2008/0246604 A1 | 10/2008 | McPherson et al. | |
| 2008/0288139 A1 * | 11/2008 | Bouchard et al. | 701/38 |
| 2008/0288150 A1 * | 11/2008 | Isogai et al. | 701/70 |
| 2009/0111652 A1 * | 4/2009 | Reedy et al. | 477/107 |
| 2009/0132138 A1 * | 5/2009 | Yasuhito et al. | 701/70 |
| 2009/0132142 A1 * | 5/2009 | Nowak et al. | 701/93 |
| 2009/0173314 A1 * | 7/2009 | Whitney et al. | 123/350 |
| 2009/0182478 A1 * | 7/2009 | Whitney et al. | 701/93 |
| 2010/0038158 A1 * | 2/2010 | Whitney et al. | 180/65.265 |
| 2010/0198427 A1 | 8/2010 | Fogelstrum et al. | |
| 2010/0286855 A1 * | 11/2010 | Yang | 701/22 |
| 2011/0082623 A1 * | 4/2011 | Lu et al. | 701/41 |
| 2011/0098886 A1 * | 4/2011 | Deng | 701/41 |
| 2012/0176234 A1 * | 7/2012 | Taneyhill et al. | 340/453 |
| 2012/0179350 A1 * | 7/2012 | Taneyhill et al. | 701/96 |
| 2012/0223828 A1 | 9/2012 | Amato et al. | |

OTHER PUBLICATIONS

Driver Instructions—Collision Warning, SmartCruise, Side Object Detection, VORAD SmartCruise® System, pp. 9-11, Eaton Corporation, Feb. 2009.

* cited by examiner

ENGINE CONTROL REQUEST FROM ADAPTIVE CONTROL WITH BRAKING CONTROLLER

BACKGROUND

The present invention relates to communication among vehicle controllers on a serial bus. It finds particular application in conjunction with communicating engine control instructions among the vehicle controllers and will be described with particular reference thereto. It will be appreciated, however, that the invention is also amenable to other applications.

Vehicles, for example heavy vehicles such as trucks and buses, increasingly utilize various controllers on a vehicle data bus (e.g., SAE 1939) for controlling different functions on the vehicle. In such configurations, each of the controllers includes a specific identifier. Then, a request to increase a torque and/or speed of the vehicle's engine may be communicated in the form of a message from one of the controllers to another one of the controllers via the data bus. Messages transmitted along the data bus include identifiers of both the originating controller and the destination controller. The identifiers are used as the messages are routed along the data bus from the originating controller to the destination controller.

It is becoming more common for heavy vehicles to include adaptive control with braking (ACB) systems. ACB systems are used for controlling a speed of a vehicle to maintain a minimum distance behind another vehicle. Currently, an engine control mode request message (e.g., a torque increase request message or a torque decrease request message) such as a torque/speed control (TSC1) message is transmitted from the ACB system to an engine controller. However, since engines of different models and makes have different levels of support for TSC1 message requests from an ACB system, only certain engines respond to a TSC1 message from an ACB system.

The engine controller may also receive additional control mode request messages from other systems on the vehicle. These additional control mode requests may conflict with the control mode request the engine controller receives from the ACB system. The engine controller may respond unpredictably upon receiving conflicting control mode requests.

The present invention provides a new and improved apparatus and method which addresses the above-referenced problems.

SUMMARY

In one aspect of the present invention, it is contemplated that a vehicle control system includes a forward vehicle sensor transmitting a forward vehicle message based on a range to a forward vehicle. An adaptive cruise controller receives the forward vehicle message from the forward vehicle sensor. The adaptive cruise controller transmits a cruise controller message based on the range to the forward vehicle. A braking system controller receives the cruise controller message and transmits an engine control message based on the cruise controller message. An engine controller receives the engine control message and controls an engine as a function of the engine control message.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
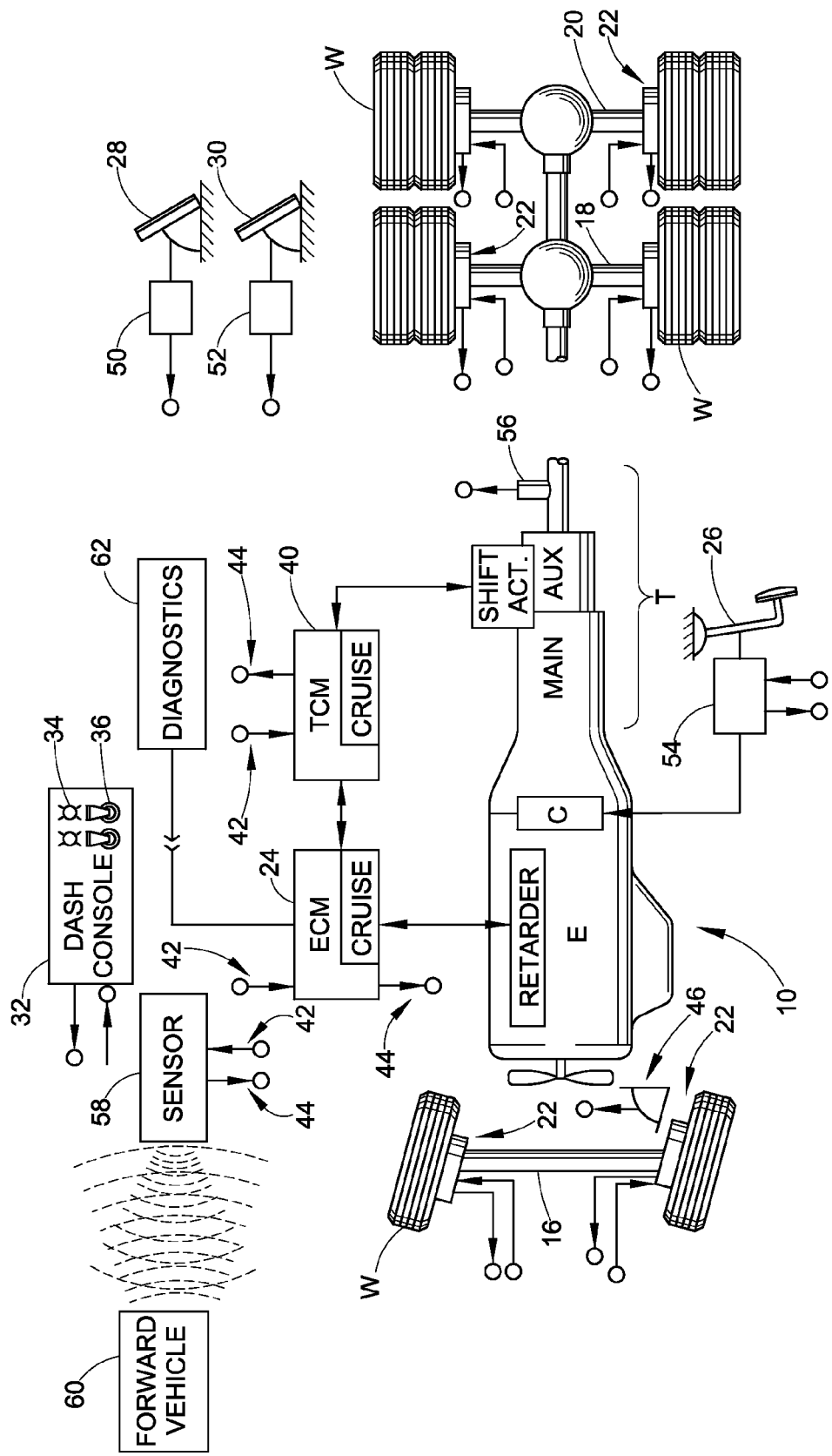
FIG. 1 illustrates a schematic representation of a vehicle in accordance with one embodiment of an apparatus illustrating principles of the present invention.

With reference to FIG. 1, a schematic representation of one embodiment of a system and method for an adaptive control with braking (ACB) cruise control system is illustrated according to one embodiment of the present invention. A vehicle 10 (e.g., a tractor of a tractor semi-trailer vehicle) includes an engine E coupled to a transmission T via a clutch mechanism C. In one embodiment, the engine E is electronically controlled. Although the vehicle 10 is illustrated as a tractor-trailer vehicle, it is to be understood that any vehicle including, for example, an electronically controlled engine is contemplated.

The vehicle 10 includes at least two axles (e.g., a steer axle 16 and at least one drive axle, such as axles 18, 20). Each axle supports corresponding wheels W having foundation or service brake components 22, which may be manually or automatically actuated depending upon the particular application and operating conditions. For example, a vehicle equipped with an antilock brake system (ABS) may assume automatic control of braking under appropriate conditions (e.g., when the vehicle is braking and the system detects a sufficient slip differential among one or more of the wheels). The operation of an ABS system is unaffected by operation of the present invention since an engine control module (ECM) 24 utilizes a priority system defined by the SAE J1587 standard or the SAE J1939 standard. In one embodiment, the priority system provides the ABS system a higher priority than the ACB cruise control system, such that the ACB system need not be aware of ABS operation. Service brake components 22 may include wheel speed sensors and electronically controlled pressure valves to effect control of the vehicle braking system.

Vehicle 10 may also include conventional operator controls such as clutch pedal (not shown) (in some manual systems), an accelerator pedal 28, a brake pedal 30, and an operator interface 32 (e.g., a dashboard control console), which may include any of a number of output devices 34 (e.g., lights, displays, buzzers, gauges, etc.), and various input devices 36 (e.g., switches, push buttons, potentiometers, etc). The vehicle control system includes an electronic control module such as the engine control module (ECM) 24 and an additional electronic control module for effecting control of transmission T, such as transmission control module (TCM) 40. Of course, engine and transmission control may be combined in a single electronic control module for some applications. The ECM 24 and TCM 40 communicate with a variety of sensors via inputs 42 and with numerous actuators via outputs 44. Sensors may include a steering angle sensor 46, wheel speed sensors (included in braking components 22), an electronic accelerator pedal sensor (APS) 50, a brake pedal sensor or switch 52, a clutch control/sensor 54, an output speed sensor 56, and a forward vehicle sensor 58 which indicates inter-vehicle distance and/or closing rate, among numerous others. It is contemplated that the forward vehicle sensor 58 provides distance and closure rate information relative to vehicle 10 and at least one forward vehicle 60.

A diagnostics module 62 may be selectively connected to the ECM 24 for communicating status messages to facilitate diagnostics, service, and maintenance of vehicle 10. These messages are also available to other system controllers (microprocessors), such as the TCM 40, and include information such as current engine speed and torque, accelerator position, road speed, cruise control status, and cruise control set speed, among many others. Cruise control status includes information relative to various cruise control switches, brake pedal switch, and clutch pedal position, among others.

It is contemplated that the ECM 24 communicates with TCM 40 according to the SAE J1939 standard. The forward vehicle sensor 58 communicates with the ECM 24 and/or the TCM 40. In one embodiment, the forward vehicle sensor 58 communicates directly with the ECM 24 utilizing the SAE J1939 standard. However, it is to be understood that the present invention relies on the exchange of control and status information independent of any particular data path or messaging protocol.

Figure 2:
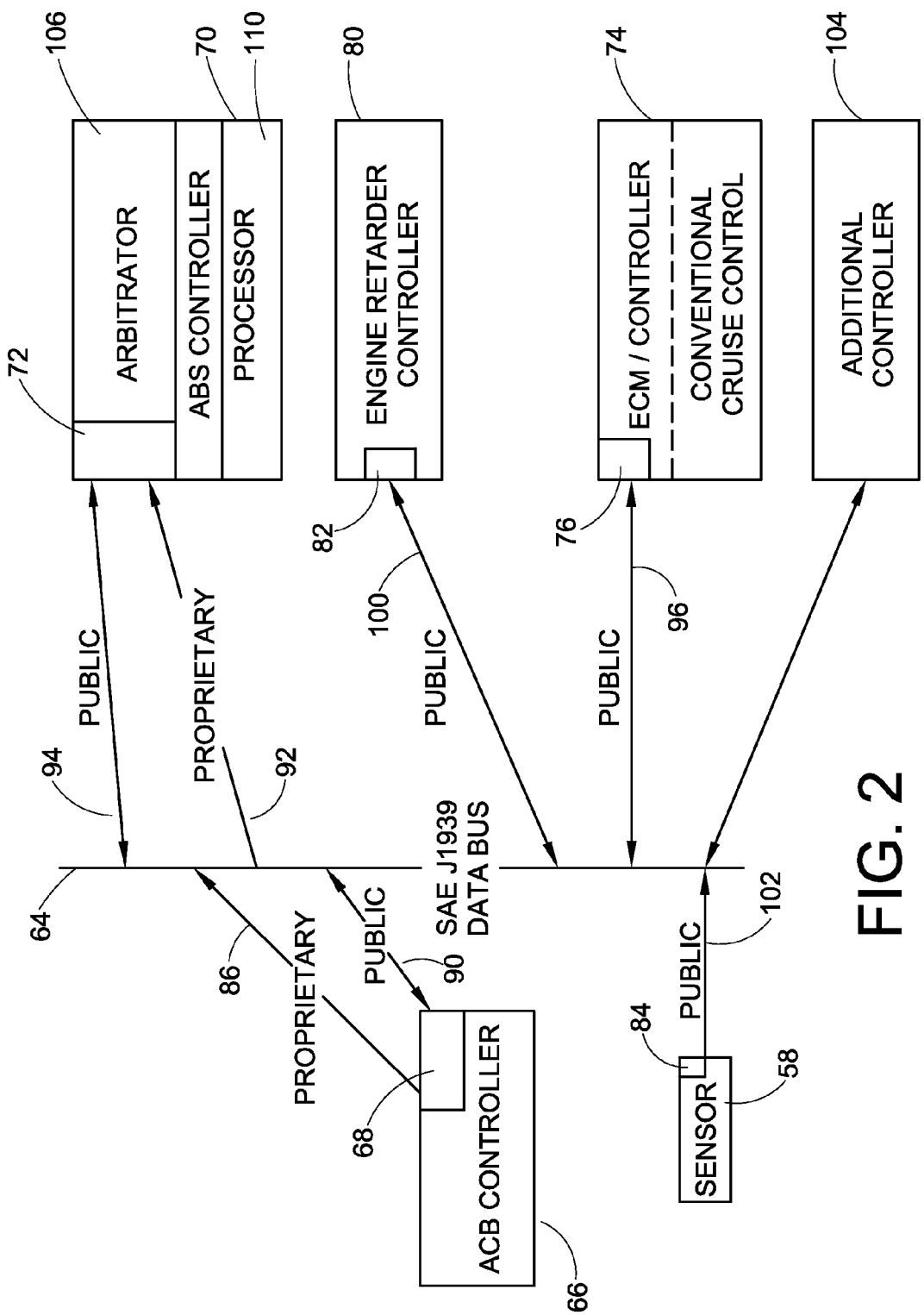
FIG. 2 illustrates a schematic representation of a vehicle communication system in accordance with one embodiment of an apparatus illustrating principles of the present invention.

With reference to FIG. 2, a vehicle data bus 64 communicates with a plurality of vehicle controllers. In one embodiment, the data bus 64 is capable of transmitting messages in various formats between the vehicle controllers. For example, the data bus 64 is capable of transmitting messages formatted according to the SAE J1939 standard and, in addition, messages formatted according to other standards (e.g., proprietary standards). In one embodiment, messages formatted according to the SAE J1939 standard are "public" messages, since controllers from many different manufacturers are designed to communicate according to the SAE J1939 standard. Messages formatted according to proprietary standards are referred to as "private" messages since, for example, only vehicle controllers manufactured by a particular manufacturer may be designed to communicate according to a particular proprietary standard.

An ACB controller 66 communicates with the data bus 64 via an ACB controller communication port 68. An ABS controller 70 communicates with the data bus 64 via an ABS controller communication port 72. An ECM controller 74 communicates with the data bus 64 via an ECM controller communication port 76. In addition, in the illustrated embodiment, an engine retarder 80 communicates with the data bus 64 via an engine retarder controller communication port 82. In one embodiment, the forward vehicle sensor 58 communicates with the data bus 64 via a forward vehicle sensor communication port 84.

As illustrated by the arrow 86, the ACB controller 66 is capable of transmitting private (proprietary) messages to the data bus 64. The arrow 90 illustrates that the ACB controller 66 is capable of both transmitting and receiving public messages to/from the data bus 64. The arrow 92 illustrates that the ABS controller 70 is capable of receiving private messages from the data bus 64. The arrow 94 illustrates that the ABS controller 70 is capable of both transmitting and receiving public messages to/from the data bus 64. The arrow 96 illustrates the ECM controller 74 is capable of both transmitting and receiving public messages to/from the data bus 64. The arrow 100 illustrates the engine retarder controller 80 is capable of both transmitting and receiving public messages to/from the data bus 64. The arrow 102 illustrates the forward vehicle sensor 58 is capable of transmitting public messages to the data bus 64.

Figure 3:
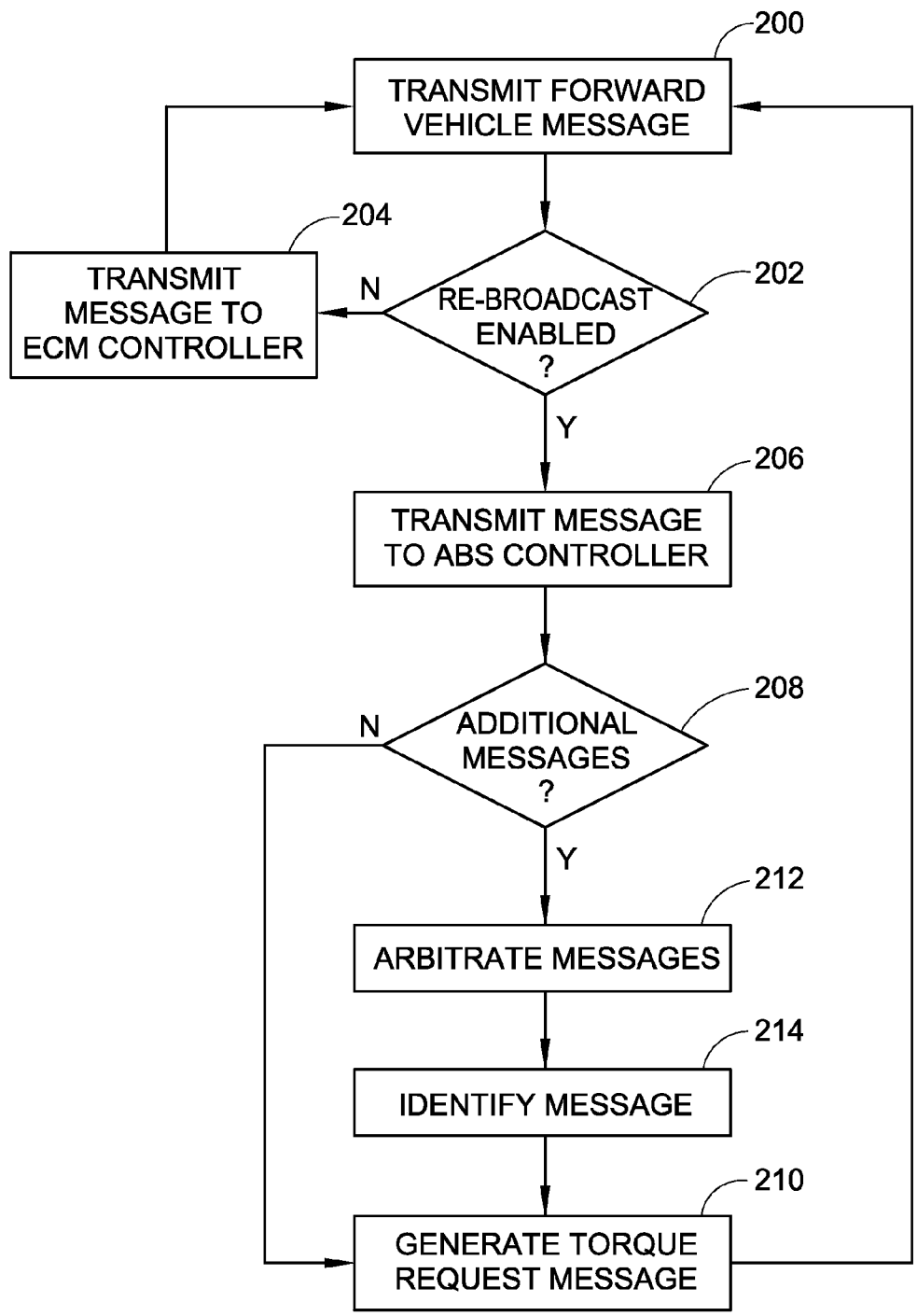
FIG. 3 is an exemplary methodology of transmitting an engine control request in accordance with one embodiment illustrating principles of the present invention.

With reference to FIGS. 2 and 3, the forward vehicle sensor 58 transmits a forward vehicle message to the ACB controller 66 via the data bus 64 in a step 200. In one embodiment, it is contemplated that the forward vehicle message is a public message with a transmitter identifier set to the forward vehicle sensor 58 and a receiver identifier set to the ACB controller 66. Therefore, the forward vehicle message is routed from the forward vehicle sensor 58 to the ACB controller 66 via the data bus 64. The forward vehicle message includes information based on a current range to a forward vehicle 60.

After the ACB controller 66 receives the forward vehicle message, the ACB controller 66 generates a cruise controller message based on range and/or relative velocity of the forward vehicle 60 with respect to the vehicle 10.

A determination is made, in a step 202, if an ACB re-broadcast feature is enabled. In one embodiment, the ACB re-broadcast feature is set via a switch on a dash 32 of the vehicle 10. If the ACB re-broadcast feature is not enabled, control passes to a step 204 in which the ACB controller transmits the cruise controller message (e.g., a public message formatted according to the SAE J1939 standard) to the ECM controller 74. In this embodiment, it is contemplated that the cruise controller message includes a transmitter identifier set to the ACB controller 66 and the receiver identifier set to the ECM controller 74. Therefore, the cruise controller message is routed from the ACB controller 66 to the ECM controller 74 via the data bus 64. The cruise controller message includes information for adjusting an engine speed and/or torque based on the current range and/or velocity of the forward vehicle 60. In one embodiment, the velocity of the forward vehicle 60 is determined based on previous range measurements between the vehicle 10 and the forward vehicle 60. Control then returns to the step 200.

If it is determined in the step 202 that the ACB re-broadcast feature is enabled, control passes to a step 206 in which the ACB controller 66 transmits the cruise controller message to the ABS controller 70. In this embodiment, it is contemplated that the cruise controller message is a private (proprietary) message that includes a transmitter identifier set to the ACB controller 66 and the receiver identifier set to the ABS controller 70. Therefore, the cruise controller message is routed from the ACB controller 66 to the ABS controller 70 via the data bus 64. As discussed above, the cruise controller message includes information for adjusting a speed and/or torque of the vehicle engine based on the range and/or velocity of the forward vehicle 60.

Once the ABS controller receives the cruise controller message, a processor 110 of the ABS controller 70 determines, in a step 208, whether any additional messages, requesting a change in the engine torque and/or speed, have been received by the ABS controller 70 from, for example, at least one additional controller 104 on the vehicle 10 (see FIG. 1) that communicates with the data bus 64 or generated by the ABS controller itself. If it is determined in the step 208 that the ABS controller 70 has not received any additional messages requesting a change in the engine torque and/or speed, control passes to a step 210 for generating an engine control (request) message in the ABS controller 70. In one embodiment, the processor 110 of the ABS controller 70 generates the engine control request message to include the cruise controller message and is formatted as a torque/speed control (TSC1) message. As discussed above, the cruise controller message includes information for adjusting a torque, a torque limit, a speed, and/or a speed limit of the vehicle engine and can include any combination of torque, torque limit, speed, and/or speed limit.

If it is determined in the step 208 that the ABS controller has received at least one additional message requesting a change in the engine torque and/or speed, control passes to a step 212. In the step 212, an arbitrator 106 determines which one of the messages, received by the ABS controller, requesting a change in the engine torque and/or speed should be included in the engine control request message generated in the ABS controller 70. In one embodiment, it is contemplated that the arbitrator 106 is included as part of the ABS controller 70.

It is contemplated that each of the messages received by the ABS controller 70 includes a priority identifier (e.g., low, medium, or high). In a step 214, the arbitrator 106 identifies the message having the highest priority. If two or more messages are identified by the arbitrator 106 as having the highest priority, the arbitrator selects, for example, the message received by the ABS controller 70 first. If one of the messages having the highest priority is identified as being received from the ACB controller, in one embodiment the arbitrator identifies any of the other messages (instead of the message from the ACB controller) to be included in the engine control request message. In another embodiment, the arbitrator 106 may use other criteria to determine which engine control request will be included in the engine control request message generated by the ABS controller 70. The arbitrator 106 may take into consideration any information available, including information available on the data bus. Some examples of information that may be considered by the arbitrator 106 include vehicle yaw, vehicle lateral acceleration, ABS activity, vehicle speed, distance to the forward vehicle, vehicle steering angle, and vehicle mass. The arbitrator 106 may also determine a new engine control request based on any of the considered information, its internally generated engine control request, and any additional controllers requesting engine control. Then, in the step 210, the ABS controller 106 generates the engine control request message to include the message identified in the step 214. In this manner, the arbitrator 106 ensures that when multiple vehicle controllers 66, 104 request a change in engine control, only a single engine control message is transmitted from the ABS controller 70 to the ECM controller 74.

In one embodiment, it is contemplated that the message received by the ABS controller 70 from the ACB controller 66 is always identified as a low priority message. Therefore, in this embodiment, messages received by the ABS controller 70 from other vehicle controllers 104 that request a change in engine torque and/or speed will usually have a higher priority than the message received from the ACB controller 66.

Control then returns to the step 200. The cycle continues until the engine is turned off.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A vehicle control system, comprising:
    a forward vehicle sensor transmitting a forward vehicle message based on a range to a forward vehicle;
    an adaptive cruise controller receiving the forward vehicle message from the forward vehicle sensor, the adaptive cruise controller transmitting a cruise controller message, including a torque control request, based on the range to the forward vehicle;
    a braking system controller receiving the cruise controller message and also receiving at least one additional message, including a torque control request, from an additional controller on the vehicle and determining a control of the engine is requested to be changed by at least one of the adaptive cruise controller and the additional controller based on the cruise controller message and additional messages and transmitting an engine control message, including the torque control request, based on the cruise controller message and additional messages;
    an arbitrator determining, based on respective priority levels of the cruise controller message and the additional message, which one of the cruise controller message and the additional message is included in the engine control message transmitted from the braking system controller when the braking system controller determines a control of the engine is requested to be changed based on messages from the adaptive cruise controller and the additional controller; and
    an engine controller receiving the engine control message including the torque control request and controlling an engine as a function of the engine control message.

2. The vehicle control system as set forth in claim 1, wherein:
    the range to the forward vehicle is a current range; and
    the adaptive cruise controller transmits the cruise controller signal based on the current range to the forward vehicle and a previous range to the forward vehicle.

3. The vehicle control system as set forth in claim 1, wherein: the cruise controller message is a private message.

4. The vehicle control system as set forth in claim 3, wherein:
    the engine control message is a public message.

5. The vehicle control system as set forth in claim 4, wherein:
    the engine control message includes an identifier indicating the engine control message was transmitted by the braking system controller.

6. The vehicle control system as set forth in claim 4, wherein:
    the public message is a TSC1 message.

7. The vehicle control system as set forth in claim 4, wherein:
    the arbitrator identifies a priority of the cruise controller message and the additional message; and
    if no other higher priority messages include a torque control request, the braking system controller converting the cruise controller message into a public message and transmitting the public cruise controller message including the torque control request as the engine control message.

8. The vehicle control system as set forth in claim 7, wherein:
    the public cruise controller message includes an identifier of the braking system controller.

9. The vehicle control system as set forth in claim 1, wherein:

the engine control message also includes at least one of a speed control request, a speed limit request, and a torque limit request.

10. The vehicle control system as set forth in claim 1, wherein:
when the braking system controller determines a control of the engine is requested to be changed based on messages from both the adaptive cruise controller and the additional controller, the arbitrator determines the braking system controller will transmit an engine control message based on the additional message.

11. A vehicle adaptive control with braking system, comprising:
a data bus;
a forward vehicle sensor sensing a distance to a forward vehicle and transmitting a forward vehicle message, based on the distance, to the data bus;
an adaptive cruise controller receiving the forward vehicle message from the data bus, the adaptive cruise controller determining if at least one of a torque and a speed of the vehicle engine should be adjusted based on the forward vehicle message and transmitting a private cruise controller message including a torque control request, based on the forward vehicle message, to the data bus;
a braking system controller receiving at least one of the private cruise controller message and an additional message from an additional controller on the vehicle from the data bus, the braking system controller determining if at least one of the cruise controller message and the additional message should be included in an engine control message, including the torque control request based on the cruise controller message and the additional message, transmitted to the data bus;
an engine controller receiving at least one of the engine control message and the additional message and controlling an engine as a function of at least one of the engine control message and the additional message; and
an arbitrator determining which one of the cruise controller message and the additional message is included in the engine control message based on respective priority levels of the cruise controller message and the additional message.

12. The vehicle adaptive control with braking system as set forth in claim 11, wherein:
the engine controller does not respond to the private cruise controller message.

13. The vehicle adaptive control with braking system as set forth in claim 11, wherein:
the cruise controller message has a lower priority level than the additional message; and
the arbitrator determines the additional message is included in the engine control message.

14. The vehicle control system as set forth in claim 11, wherein:
if no other higher priority messages include a torque control request, the braking system controller converting the cruise controller message into a public message and transmitting the public cruise controller message including the torque control request as the engine control message.

15. A method for controlling a vehicle engine, the method comprising:
detecting a range to a forward vehicle by a forward vehicle sensor;
transmitting a forward vehicle message, based on a range to the forward vehicle, from the forward vehicle sensor to a vehicle communication data bus;
receiving the forward vehicle message by an adaptive cruise controller;
transmitting a cruise controller message including a torque control request, based on the range to the forward vehicle, from the adaptive cruise controller to the vehicle communication data bus, the cruise controller message including a request to change at least one of a torque and a speed of the engine;
receiving the cruise controller message including a torque control request by a braking system controller;
receiving at least one additional message by the braking system controller from an additional controller on the vehicle, the at least one additional message including a request to change the at least one of the torque and the speed of the engine;
an arbitrator that is part of at least one of an anti-lock brake controller and the braking system controller arbitrating between the cruise controller message request to change the at least one of the torque and the speed of the engine and the additional message request to change the at least one of the torque and the speed of the engine;
transmitting at least one of the cruise controller message including a torque control request and the additional message as an engine control message, based on the respective priority levels of the cruise controller message and the additional message, from the braking system controller to the vehicle communication data bus, based on the arbitrating step;
receiving the engine control message by an engine controller; and
controlling the at least one of the torque and the speed of the engine as a function of the engine control message.

16. The method for controlling a vehicle engine as set forth in claim 15, wherein transmitting the forward vehicle message includes:
transmitting the cruise controller message as a private message.

17. The method for controlling a vehicle engine as set forth in claim 16, wherein transmitting the engine control message includes:
transmitting the engine control message as a public message.

18. The method for controlling a vehicle engine as set forth in claim 17, wherein transmitting the engine control message includes:
transmitting the engine control message with an identifier indicating the torque control message was transmitted by the braking system controller.

19. The method for controlling a vehicle engine as set forth in claim 15, further including:
the cruise controller message having an arbitrator selected engine control message transmitted from the braking system controller.

20. The vehicle control system as set forth in claim 15, further including:
if no other higher priority messages include a torque control request, converting the cruise controller message into a public message and transmitting the public cruise controller message including the torque control request as the engine control message.

21. A braking system controller comprising:
a communication port receiving, from a vehicle communication system, a cruise controller message from an adaptive cruise controller and at least one additional message from an additional controller on a vehicle;
a processing unit, in data communication with the communication port, processing the cruise controller message and the additional message requesting to control a torque of an engine of the vehicle; and an arbitrator included as part of the braking system controller for selecting one of the cruise controller message and the additional message to be sent to an engine controller via the vehicle communication system, based on respective priority levels of the cruise controller message and the additional message, the processing unit generating an engine control message, including the selected message, to be sent to the engine controller via the communication port.

* * * * *